United States Patent Office

3,694,149
Patented Sept. 26, 1972

3,694,149
PURIFIED BLUE COLORED INORGANIC MACRO-MOLECULAR COMPLEX COMPOUNDS
Yoshio Matsumoto, Fujisawa, Michiko Shirai, Tokyo, Hiroko Saito, Yokohama, and Takeshi Kawashima and Yuzuru Sakabe, Tokyo, Japan, assignors to Kitazato Gakuen
No Drawing. Filed Mar. 30, 1970, Ser. No. 23,994
Claims priority, application Japan, Mar. 31, 1969, 44/24,692
Int. Cl. C01c *3/12, 3/08*
U.S. Cl. 23—293          1 Claim

ABSTRACT OF THE DISCLOSURE

Intensely colored inorganic macromolecular complex compounds or the solution thereof for use in determining the void volume ($V_o$) of the gel column are provided by a process wherein the crude solution of the so-called Soluble Prussian Blue or the reaction solution resulting from the mixture of chromium (III) salt and alkali ferrocyanide is purified macromoleculologically, that is, purified to provide the macromolecular substance possessing the desired range of magnitude of molecular size, by means of gel chromatography which comprises a function of molecular sieve, or alternatively, by means of a salting out procedure.

---

This invention first relates to purified blue-colored inorganic macromolecular complex compounds useful as reagents for determining the void volume (the volume of external water), $V_o$, in a gel-chromatography column, and nextly providing the method for preparing the reagents above-described.

Recently, gel chromatography found its roles in the fields of inorganic chemistry and coordination chemistry beside its usual application in the fields of biochemistry and medical chemistry.

In gel chromatography, for example such as Sephadex column chromatography, it is often necessary to determine either by experimental measurement or by calculation the void volume (the volume of external water), $V_o$, of the gel column in order to calculate the distribution coefficient of a substance under consideration for internal water to external water of the gel particles, by which coefficient the substance might be characterized and its molecular size or molecular weight estimated.

In calculation of the void volume, $V_o$, the following relation is used:

$$Vt = Vi + Vo + Vg$$

where, $Vt$ is the volume of the gel column which can be known from the height and diameter of the column; $Vi$ is the volume of internal water (the volume of water contained in the gel particles) which can be easily known; and $Vg$ is volume of the total dry gel used in column.

Since it is not easy to estimate exactly the value of the last term, $Vg$, an accurate calculation of the value of $Vo$ in terms of the above equation can not be expected.

Hence it was usual to measure $Vo$ experimentally using an index material which is a macromolecular substance of extremely large particle size, possessed of little attractive interaction with the gel, soluble in water, and visually detectable.

The void volume, $Vo$, of the gel column is given by direct measurement of the volume of water necessary for an elution of the index substance out of the column, i.e. elution volume of the index substance.

"Blue Dextran 2,000" (commercially available from "Farmacia Co.," molecular weight about 2,000,000) was conventionally used for this purpose.

The Blue Dextran 2,000, however, not only is very expensive but also has an unfavorable character that the blue colored layer of it in the gel column tends to diffuse and expand itself considerably during its descent through the column in the case of elution with water.

When it nearly reaches the depth of the column it should have diffused so much and its color should have become so faded that it becomes difficult to distinguish the location of the layer and to decide the elution volume of it.

On the other hand it is found that the intensely blue-colored macromolecular metal-complex specified by this invention diffuses very little on the gel column chromatography and thus expansion of the blue layer of the substance in the course of column chromatography on Sephadex was very slight. Since the layer of the blue substance of this invention keeps its narrow thickness, clear-cut outline, and intense blue color until it reaches the bottom of the column, it is possible to measure its elution volume, i.e. the void volume ($Vo$) of the column, easily and accurately.

The substances of this invention comprising inorganic macromolecular complex compounds are classified into two kinds of groups, (I) and (II) as following.

(I) The substance comprising a blue colored inorganic macromolecular complex compound which belongs to the first group of the substances of this invention is produced as a so called Soluble Prussian Blue and purified macromoleculologically, that is, purified to provide the macromolecular substance possessing the desired range of magnitude of molecular size free from substances of smaller molecular size by treating the crude solution of it by gel chromatography as a function of molecular sieve, or alternatively by means of salting out.

So called Soluble Prussian Blue represented by the chemical formula $KFe^{II}Fe^{III}(CN)_6$, can be prepared by several modes of procedures. It is produced most favorably by mixing any ferric salt with potassium ferrocyanide in the molar ratio of 1 to 1 to react in an aqueous solution.

As an alternative procedure, mixing of any ferrous salt with potassium ferricyanide in the ratio of 1 to 1 to react in an aqueous solution produces the similar complex compound, blue colored, soluble in water, and represented too by the formula $KFe^{II}Fe^{III}(CN)_6$, which can be referred to as the same kind of substance.

Another procedure is to mix any ferrous salt with potassium ferrocyanide in the molar ratio of 1 to 1 in aqueous solution and oxidize the white precipitate thereby produced, $K_2Fe^{II}Fe^{II}(CN)_6$.

In any one of the above mentioned ways, the resulting blue colored reaction solution usually contains substances of various molecular sizes (ranging from the extremely large size of molecule or colloidal particle to the molecule or particle not so large in size) in addition to the reactant substances which remain unreacted and small in molecular size, and thus the reaction mixture in its intact state is not suitable as the index reagent for determining the void volume ($Vo$) of a gel column. The fact above-described can be easily visualized by subjecting to a chromatography of a gel column possessing the function of a molecular seive such as Sephadex G–25, G–50, G–75, G–100, G–200, etc., "Sephadex" is the trade name of a material sold by Pharmacia Co., Uppsala, Sweden, for use in gel chromatography, which is characterized by its function as a molecular sieve. This material is prepared from dextran by cross-linking it together with epichlorhydrin to produce a three dimensional network structure, which is insoluble in but hydrophilic to water. The material swells in aqueous solvents to produce a gel, and the gel particles act as a molecular sieve because of their network structure, limiting the diffusion of solute molecules into them, in accordance with molecular sizes, the blue colored reaction solution resulting from any one of the formerly mentioned procedures of producing Soluble Prussian Blue.

A variety of colored layers corresponding to a variety of molecular or particle sizes is found to separate, v.g. blue layers and yellowish green layers etc.

The reagent of this invention is prepared by subjecting the crude aqueous solution of Soluble Prussian Blue which is a reaction mixture resulting from any one of the formerly described procedures to chromatography on a gel column possessing the function of a molecular sieve such as a column of Sephadex comprising Sephadex G–25 and any one of those having a larger pore size (G–25, G–50, G–75, G–100, G–200 etc.), and obtaining the intensely blue colored layer first eluting out with water.

The substance contained in the obtained layer being of the molecular weight surpassing 2,000,000 can be referred to as "macromoleculologically purifed Soluble Prussian Blue."

The macromoleculologically purified Soluble Prussian Blue is the most suitable as a reagent for determining Vo of a gel column, since it descends through the gel column being kept in the state of sharply bordered, thin layer with intense blue color.

Next to the most desirable method of preparation described above, dialysis method is recommended for the preparation of the reagent of this invention. The crude aqueous solution of Soluble Prussian Blue, i.e. the reaction mixture resulting from any one of formerly described procedures for producing Soluble Prussian Blue is held in a cellophane film or tube and dialysed with water so that the substances of the smaller molecular size are removed off and only macromolecular substance is obtained in the cellophane film or tube, which is blue colored macromolecular complex compound suitable for determining Vo of a gel column.

The alternative method applicable is "salting out" of the macromolecular Soluble Prussian Blue. The crude aqueous solution of Soluble Prussian Blue, the reaction mixture resulting from any one of the formerly described procedures for producing Soluble Prussian Blue, is mixed with KCl, $(NH_4)_2SO_4$ or any other electrolyte which is known as useful for "salting out" so as to cause the macromolecular particles to precipitate out of the solution.

The letter method above described can provide the macromoleculologically purified Soluble Prussian Blue suitable for the index reagent of this invention, but in this case being possessed of a defect that the macromolecular complex compound once precipitated by salting out often becomes less soluble with duration of time while it can be easily redissolved in water immediately after of its precipitation.

Of these possible methods of preparing the macromoleculologically purified Soluble Prussian Blue as a reagent specified by this invention, the preparation by Sephadex column chromatography is the most desirable because it allows the macromoleculological purification with easiness and quickness, keeping the substance in a state of aqueous solution throughout the process.

It is often useful to prepare the desired substance by a combination of the two above described methods, i.e., Sephadex column and salting out.

The macromoleculologically purified Soluble Prussian Blue obtained herein is about 4 in the value of log $\epsilon$ (where $\epsilon$ is a molar absorption coefficient per gram atom of iron) and is estimated to have the molecular size (or particle size) corresponding to the molecular weight of about 2,000,000 or more, the estimation based on the results of its chromatographical separation on Sephadex and ultracentrifugal precipitation.

The excellent properties of this substance as a Vo determining reagent are demonstrated by comparing it with the conventional reagent, Blue Dextran 2,000, commercially available from Pharmacia Co. in a descending method gel chromatography using Sephadex G–25 or G–100.

A blue colored inorganic macromolecular complex compound of this invention, the Soluble Prussian Blue purified macromoleculologically, descends through the gel column with its feature of sharply bordered, intensely blue colored, thin layer maintained until it reaches the depth of the column, and subsequently makes it easy to determine the elution volume of it, i.e. the void volume (Vo) of the column, while on the other hand Blue Dextran 2,000 diffuses in the gel column and its blue colored layer gel column expands itself more and more widely during its descent through the column in the case of elution with water, so that its layer has become widely diffused with an obscure outline when it approaches the bottom.

As a conclusion, it can be stated that the inorganic macromolecular complex compound of this invention is superior to the conventional reagent, Blue Dextran 2,000, as the Vo determing reagent in gel chromatography in the case of elution with water.

(II) The substances comprising blue colored inorganic macromolecular complex compounds, belonging to the second group of the substances of this invention, are complex compounds which contain Cr, Fe and CN, and may contain some other elements such as K, Na, Li, Rb, Cs, $NH_4$, H, OH, etc.

A representative substance belonging to this group is a complex compound containing Cr, Fe, K and CN, where K may be replaced by Na or any other alkali metals.

This substance can be prepared by making any Cr(III) salt (for example, chrome alum) react with potassium ferrocyanide in an aqueous solution (more than about 3 hrs. at room temperature, and more than 30 minutes at 50° C. are desirable as the reaction time, and bubbling of oxygen or air or addition of oxidizing agent may be introduced in the reaction system), and subjecting the resulting reaction mixture to chromatography on a gel column possessing the function of a molecular sieve, such as Sephadex G–50, G–75, G–100, or G–200 etc. with elution by water, and obtaining the blue fraction first eluted out. (Also with Sephadex G–25 column, the blue colored complex compound is eluted first, but in the case with G–25 column the green substance of the smaller molecular size is simultaneously eluted mixed with the desired blue substance. In order to remove the green substance off, the fraction is subjected to further chromatography on the Sephadex of the larger pore size than Sephadex G–25, or salting out is necessary.)

The blue colored complex compound thus obtained is the substance composed of Cr, Fe, K and CN, soluble in water, not passing through cellophane film and estimated to be of molecular weight exceeding 2,000,000 based on the results of its chromatographical separation on Sephadex columns and its centrifugal precipitation.

Without using Sephadex column, the same substance can also be obtained either by treating the reaction mixture by means of "salting out" with KCl or $(NH_4)_2SO_4$.

The macromoleculologically purified, blue colored, macromolecular complex compound belonging to the second group of the substances of this invention is prepared by treating the reaction solution with either of the above described processes or with a combination of them.

This substance scarcely diffuses into gel particles and its layer in gel column keeps its features during its descent through the gel column; its thickness is kept thin, its color kept intense and its border interfaces kept clear-cut, till it reaches the bottom of the column, so that it is possible to determine V$o$ of gel column exactly by means of this substance. The substance of this group of this invention, however, is a minor part of the products of the reaction between Cr(III) salt and potassium ferrocyanide so that its yield is low.

EXAMPLE 1

The macromoleculologically purified Soluble Prussian Blue resulting from ferric chloride and potassium ferrocyanide.

Gradual addition with stirring of an aqueous solution of ferric chloride consisting of 4.98 g. (0.018 mole) of ferric chloride $FeCl_3 \cdot 6H_2O$ dissolved in 400 ml. of water to an aqueous solution of potassium ferrocyanide consisting of 8.45 g. (0.02 mole) of potassium ferrocyanide $K_4Fe(CN)_6 \cdot 3H_2O$ dissolved in 400 ml. of water resulted in an intensely blue colored crude solution of so-called Soluble Prussian Blue.

The resulting blue solution was applied to a Sephadex G-75 column, and on elution with distilled water, the intensely colored layer which is first eluted out was recovered. Soluble Prussian Blue purified macromoleculogically, i.e. purified free from the substance of the smaller molecular size, was thus prepared.

Substances of the smaller molecular size, whether any starting material such as potassium ferrocyanide remaining unreacted or any reaction product it may be, are eluted later after the desired macromolecular Soluble Prussian Blue, and therefore it can be easily eliminated.

The fact that some colored reaction products of not so large a molecular size (the colors of these products are in majority greenish blue or yellowish green) have been produced and exist mixed with the macromolecular Prussian Blue in the reaction solution was demonstrated on this chromatographical separation of the reaction mixture with Sephadex column. The solution of the macromoleculologically purified Soluble Prussian Blue thus obtained gave on chemical analysis the molar ratio of 1 to 3.04 for Fe to CN.

The blue colored substance obtained by separation with Sephadex column is dispersed as a molecule or particle of very large size in water, making a colloid solution which on dialysis has shown that the blue substance does not permeate through the cellophane film.

With an addition of the concentrated solution of KCl, KBr or $(NH_4)_2SO_4$, the blue colored substance was salted out and precipitated from the solution.

The aqueous solution of Soluble Prussian Blue macromoleculologically purified by the Sephadex column on application to the gel column of Sephadex G-25, fine (2 cm. in diameter and 27 cm. in length), with elution by water (elution velocity: 98 ml./hr.), descended through the gel column as an intensely blue layer of about 1.5 cm. in thickness, which maintained its clear-cut outline without expanding its thickness until it reached the bottom of the column. The elution volume of the blue layer was 40 ml.

0.8 ml. of the same solution of the macromoleculogically purified Soluble Prussian Blue, on application to a gel column (2 cm. in diameter and 24 cm. in length) of Sephadex G-100 (particle size 40-120$\mu$) with elution by water (elution velocity: 48 ml./hr.), descended through the gel column as an intensely blue layer of about 1.5 cm. in thickness, which maintained its clear-cut outline without expanding its layer-thickness until it reached bottom of the column. The elution of the blue layer began at the effluent volume of 30 ml. and ceased at 35 ml.

On application of the aqueous solution of commercially available Blue Dextran 2,000 (molecular weight of about 2,000,000) to the respectively same column (Sephadex G-25 and G-100, respectively) under the respectively same conditions as in the cases of the Soluble Prussian Blue on two different columns, it was observed that the blue colored layer expanded in thickness and gradually lost its clear-cut outline as it descended through the gel column. The blue color of the layer was found to fade during the descent of the layer.

When the descending blue layer has covered about two thirds of the length of column, the thickness of the blue layer has expanded to more than about 3 cm., so that it has become difficult to determine its elution volume exactly, whether one may intend to measure it at the medium point or the bottom end of the layer.

As to the elution volume measured at the bottom end of the blue colored layer in the descending method of chromatography, both the blue layer of the macromoleculogically purified Souble Prussian Blue of this invention and the blue layer of the Blue Dextan 2,000 gave the same elution volume under the same conditions with the same columns (both reagents showed the elution volume of 40 ml. under the above described conditions with Sephadex G-25 column and 30 ml. with Sephadex G-100 column).

The elution volume, however, if measured at the medium point of the blue colored layer, will increase by a considerable amount for the layer of Blue Dextran 2,000 since the distance between the medium point and the bottom end of the layer is not so small in the case of Blue Dextran, while the corresponding distance in the case of the layer of the Soluble Prussian Blue is very small so that the elution volume of the latter is substantially identical no matter what part of the layer may be chosen as an index point for the determination of the elution volume. Thus particular excellency of the purified Soluble Prussian Blue as a V$o$ determining reagent is illustrated by this example.

EXAMPLE 2

The macromoleculologically purified Soluble Prussian Blue resulting from ferrous sulfate and potassium ferrocyanide Gradual addition with stirring of 100 ml. of 0.1 M aqueous solution of ferrous sulfate to 100 ml. of 0.1 M aqueous solution of potassium ferrocyanide resulted in a blue colored reaction solution. The resulting blue solution was applied to a Sephadex G-25 column, and the intensely blue colored layer which is first eluted out on elution by distilled water was recovered.

The blue colored layer thus obtained was the solution of the Soluble Prussian Blue purified macromoleculologically, i.e. purified free from the substances of the smaller molecular size, the latter being easily removed off, regardless of whether reaction products or starting materials, since they are eluted late after the desired macromolecular substance is eluted. The fact that some colored reaction products of not so large a molecular size (the colors of these products are in majority greenish blue or yellowish green) have been produced and existing mixed with the desired macromolecular Prussian Blue in the reaction mixture was demonstrated on this chromatographical separation of the reaction mixture with a Sephadex column.

The blue colored substance obtained by separation with a Sephadex column is dispersed as a molecule or particle of very large size in water, making a colloid solution which on dialysis has shown that the blue substance does not permeate through the cellophane film.

With an addition of the concentrated solution of KCl, KBr or $(NH_4)_2SO_4$, the blue colored substance was salted out and precipitated from the solution.

The aqueous solution of the Soluble Prussian Blue having been purified macromoleculologically by the Sephadex column on application to the gel column of Sephadex G-25, fine, and Sephadex G-100 with elution by water under the same conditions as in the respective case described in Example 1 showed the same behaviors as the macromolecular substance in Example 1 showed on the respective columns, proving that the Soluble Prussian Blue described in Example 2 is of the same properties as that in Example 1 in regard to the elution on the Sephadex columns.

A difference was found between both of the Soluble Prussian Blues in regard to the solubility in water. The solid obtained by evaporating to dryness under vacuum the solution of the Soluble Prussian Blue in Example 1 is easily redissolved in water whereas the solid obtained in the same way from the Soluble Prussian Blue in Example 2 became less soluble in water.

EXAMPLE 3

The macromoleculologically purified blue colored complex compound resulting from Cr(III) salt and potassium ferrocyanide The solution obtained by reacting potassium ferrocyanide with Cr(III) ions (chrome alum) in a molar ratio of 5:1 for one hour in an aqueous solution at 47° C., when applied to a Sephadex G-25 column, gave a bluish-green fraction eluting first and a reddish brown one eluting second, the unreacted ferrocyanide and sulfate ions remaining behind in the column.

The first fraction of bluish-green color, giving two components in paper electrophoresis, was definitely separated when further applied to a column of Sephadex G-75 or G-100 (any other Sephadex of the larger pore size than that of Sephadex G-25, can be used), into two fractions, blue and green. The first fraction of blue color is an aqueous solution of the desired macromolecular complex compound containing K, Cr, Fe and CN, which belongs to the second group of the substances of this invention and which has been purified macromoleculologically or purified free from the substances of the smaller molecular size, whether reaction products or starting materials.

The blue colored substance obtained by separation with a Sephadex column is dispersed as a molecule or particle of very large size in water, making a colloid solution which on dialysis has shown that the blue substance does not permeate through the cellophane film. With an addition of the concentrated solution of KCl, KBr or $(NH_4)_2SO_4$ the blue colored substance was salted out and precipitated from the solution.

The blue substance very much resembles the Soluble Prussian Blue in the shape of infrared spectra ranging from 400 cm.$^{-1}$ to 3500 cm.$^{-1}$.

In visible and ultraviolet spectra, both resemblance and difference are found between this substance and the Soluble Prussian Blue.

The most distinguishing evidence on this substance is that the substance contains chromium.

The intensely blue colored macromolecular complex compounds having been macromoleculologically purified when applied to Sephadex G-25 column and Sephadex G-100 column under the same conditions as in the case of the Soluble Prussian Blue in Example 1, exhibited the same behaviors as the Soluble Prussian Blue did, and thus proved to be excellently suitable as Vo determining reagent.

What is claimed is:

1. A method of preparing an intensely colored inorganic macromolecular complex compound or solution thereof as a reagent for determining the void volume of a gel column, which comprises purifying a crude solution of Soluble Prussian Blue or the reaction solution resulting from reaction of a chromium (III) salt with potassium ferrocyanide to remove inorganic substances of smaller molecular size from an inorganic macromolecular metal complex compound by means of a gel column of Sephadex G-25, G-50, G-75, G-100 or G-200, recovering the complex compound as the first fraction of the purification procedure.

References Cited

UNITED STATES PATENTS

| 3,467,595 | 9/1969 | Sten | 210—31 C |
| 2,104,501 | 1/1938 | Adams et al. | 260—2.2 C |
| 2,151,883 | 3/1939 | Adams et al. | 260—2.1 C |
| 2,444,939 | 7/1948 | Mayer | 210—22 |
| 2,592,169 | 4/1952 | Morrison et al. | 23—77 |

OTHER REFERENCES

C & EN, Mar. 18, 1963, "Salting-Out Chromatography Separates ABS," procedure used to separate mixtures of Alkylbenzenesulfonates in aqueous solution, p. 42.

OSCAR R. VERTIZ, Primary Examiner

H. S. MILLER, Assistant Examiner

U.S. Cl. X.R.

210—20